United States Patent
Dong et al.

(10) Patent No.: US 12,391,328 B2
(45) Date of Patent: Aug. 19, 2025

(54) VEHICLE

(71) Applicant: SEGWAY TECHNOLOGY CO., LTD., Changzhou (CN)

(72) Inventors: Zhen Dong, Changzhou (CN); Shuting Yan, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 535 days.

(21) Appl. No.: 17/474,135

(22) Filed: Sep. 14, 2021

(65) Prior Publication Data
US 2022/0089243 A1 Mar. 24, 2022

(30) Foreign Application Priority Data
Sep. 21, 2020 (CN) .................. 202022087621.1

(51) Int. Cl.
*B62K 5/01* (2013.01)
*B62J 35/00* (2006.01)
*B62J 37/00* (2006.01)

(52) U.S. Cl.
CPC .............. *B62K 5/01* (2013.01); *B62J 35/00* (2013.01); *B62J 37/00* (2013.01)

(58) Field of Classification Search
CPC ...... B62J 35/00; B62K 5/01; B60Y 2200/124; B60K 2015/0637
USPC .................................................. 280/834, 835
See application file for complete search history.

(56) References Cited

U.S. PATENT DOCUMENTS

| | | | |
|---|---|---|---|
| 6,523,634 B1 * | 2/2003 | Gagnon | B60K 17/06 180/908 |
| 6,626,260 B2 * | 9/2003 | Gagnon | B60K 15/01 180/908 |
| 6,920,949 B2 * | 7/2005 | Matsuura | B60T 5/00 180/908 |
| 9,873,316 B2 | 1/2018 | Lovold et al. | |
| 10,569,819 B2 | 2/2020 | Lovold et al. | |
| 2006/0278451 A1 * | 12/2006 | Takahashi | B60K 11/04 180/68.1 |
| 2008/0236918 A1 * | 10/2008 | Hanafusa | B60K 15/063 180/68.4 |
| 2011/0226538 A1 * | 9/2011 | Brady | B62K 5/01 180/54.1 |
| 2019/0248405 A1 * | 8/2019 | Bennett | B62K 5/01 |
| 2020/0072164 A1 * | 3/2020 | Higashiyama | B62J 37/00 |

FOREIGN PATENT DOCUMENTS

EP 1553331 B1 * 3/2007 ......... F16H 57/0415
WO WO 2006/072077 7/2006

OTHER PUBLICATIONS

Extended European Search Report dated Jan. 17, 2022 for Application No. 21196325.1, 7 pages.

* cited by examiner

*Primary Examiner* — Christopher B Wehrly
(74) *Attorney, Agent, or Firm* — Frost Brown Todd LLP

(57) ABSTRACT

A vehicle is provided. The vehicle includes: a frame; a seat arranged on the frame; a powertrain arranged on the frame; a steering system arranged on the frame, and including a steering shaft, the steering shaft being located in front of the powertrain; and a fuel tank located behind the steering shaft and in front of the powertrain.

16 Claims, 5 Drawing Sheets

VEHICLE

CROSS-REFERENCE TO RELATED APPLICATION

This application claims the benefit of priority to Chinese patent Application No. 202022087621.1, filed on Sep. 21, 2020, the content of winch is incorporated herein by reference in its entirety.

FIELD

The present disclosure relates to a field of vehicle technologies, and more particularly, to a vehicle.

BACKGROUND

In the related art, a fuel tank of an all-terrain vehicle is usually arranged in front of a driving seat and behind a steering handle. However, by arranging the fuel tank in this way, a volume of the fuel tank is generally limited, and a center of gravity of the whole all-terrain vehicle is relatively high, thus affecting the stableness of the all-terrain vehicle during driving.

SUMMARY

Embodiments of the present disclosure provide a vehicle. The vehicle includes: a frame; a seat arranged on the frame; a powertrain arranged on the frame; a steering system arranged on the frame and including a steering shaft, and the steering shaft being located in front of the powertrain; and a fuel tank arranged on the frame, and located behind the steering shaft and in front of the powertrain.

Additional aspects and advantages of the present disclosure will be given in part in the following description, become apparent in part from the following description, or be learned from the practice of the present disclosure.

BRIEF DESCRIPTION OF THE DRAWINGS

The above and/or additional aspects and advantages of the present disclosure will become apparent and easy to understand from the following description of the embodiment in combination with the accompanying drawings.

DETAILED DESCRIPTION

Figure 1:
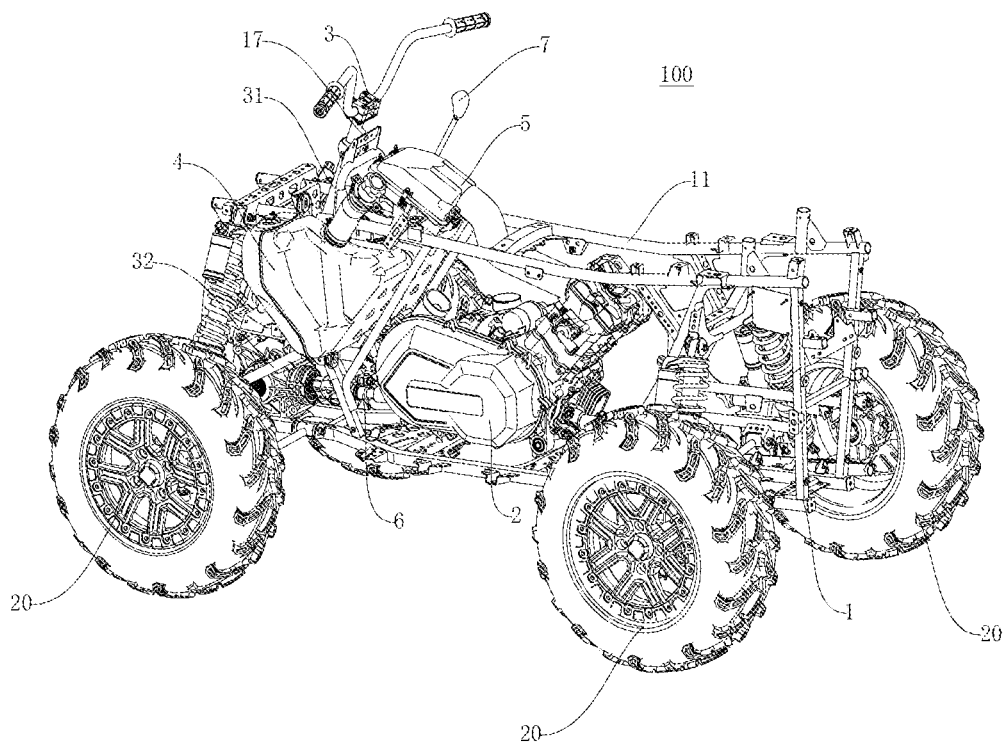
FIG. 1 is a perspective view of a vehicle according to an embodiment of the present disclosure.

Embodiments of the present disclosure are described in detail below. The embodiments described with reference to accompanying drawings are exemplary.

A vehicle 100 according to embodiments of the present disclosure is described below with reference to FIGS. 1-9. The vehicle 100 may be an all-terrain vehicle, such as a straddle all-terrain vehicle. In the following description of the present application, the description is made by an example in which the vehicle 100 is the all-terrain vehicle, such as the straddle all-terrain vehicle. Of course, those skilled in the art can understand that the vehicle 100 can further be other types of vehicles, not limited to the all-terrain vehicle, such as the straddle all-terrain vehicle.

As shown in FIGS. 1-9, the vehicle 100 according to the embodiments of the present disclosure includes a frame 1, a seat 8, a powertrain 2, a steering system 3 and a fuel tank 4.

Specifically, the frame 1 can provide a mounting carrier for mounting various components (such as the powertrain 2 and the steering system 3) of the vehicle 100, so as to ensure the mounting stability of the various components. The seat 8, the powertrain 2 and the steering system 3 are all arranged on the frame 1. The steering system 3 includes a steering shaft 31 located in front of the powertrain 2. The fuel tank 4 is arranged on the frame 1, and located behind the steering shaft 31 and in front of the powertrain 2. Here, it should be noted that a forward direction of the vehicle 100 during driving is a "front" direction. On the contrary, a backward direction of the vehicle 100 during driving is a "rear" direction.

For example, in the examples of FIGS. 1-7, the vehicle 100 further includes wheels 20 and a suspension system. The suspension system is connected to the wheels 20 and the frame 1, and supports the frame 1 on the ground, so as to ensure the stability of the frame 1. The powertrain 2 may be mounted in the middle of the frame 1 to provide a driving force for the driving of the vehicle 100. The seat 8 is mounted above the powertrain 2, and an upper surface of the seat 8 includes a horizontal seat surface, so that a driver can sit on the seat surface and drive the vehicle 100, thus ensuring the comfort of the driver during the driving of the vehicle 100. The steering system 3 may be arranged adjacent to the powertrain 2, and is connected to front wheels of the vehicle 100 to control a driving direction of the vehicle 100. The fuel tank 4 can be mounted on the frame 1. The fuel tank 4 can include a fuel pump, and can supply fuel to the powertrain 2 through the fuel pump and a fuel pipe. The fuel tank 4 is arranged between the steering shaft 31 and the powertrain 2, and is located behind the steering shaft 31 and in front of the powertrain 2. Compared with a traditional manner in which the fuel tank is arranged in front of a driving seat and behind a steering handle, an arrangement manner of the fuel tank 4 of the present disclosure allows the fuel tank 4 to be closer to the ground, which thus facilitates to lower a center of gravity of the vehicle 100, thereby effectively ensuring the stability of the vehicle 100 during driving. Moreover, since a space between the steering shaft 31 and the powertrain 2 is relatively larger, a volume of the fuel tank 4 can be made larger.

In the vehicle 100 according to the embodiments of the present disclosure, since the fuel tank 4 is arranged behind the steering shaft 31 and located in front of the powertrain 2, the center of gravity of the vehicle 100 is lowered, so as to effectively ensure the stability of the vehicle 100 during driving. In addition, the volume of the fuel tank 4 can be made relatively larger.

According to some specific embodiments of the present disclosure, referring to FIGS. 3-8, the fuel tank 4 includes a tank body 42. The frame 1 includes two first main beams 11, two second main beams 12, two first support members 13 and two second support members 14. Specifically, the two first main beams 11 are spaced apart in a left-right direction, the two second main beams 12 are spaced apart in the left-right direction, and the two second main beams 12 are located below the two first main beams 11, respectively. The two first support members 13 are spaced apart in the left-right direction, and two ends of each first support member 13 are connected to the first main beam 11 and the second main beam 12 on the same side, respectively. The two second support members 14 are spaced apart in the left-right direction, and two ends of each second support member 14 are connected to the first main beam 11 and the first support member 13 on the same side, respectively. The two first main beams 11, the two first support members 13 and the two second support members 14 define an accommodating space 15 therebetween together, and the tank body 42 is arranged in the accommodating space 15.

For example, in combination with FIGS. 3-8, the two first main beams 11 can be substantially located in a same horizontal plane, and are spaced apart from each other in the left-right direction. The two second main beams 12 can be substantially located in a same horizontal plane, and are arranged under the two first main beams 11 while being spaced apart from each other in the left-right direction. An upper end of each first support member 13 is connected to one of the two first main beams 11, and a lower end of each first support member 13 is connected to one of the two second main beams 12 on the same side as the one of the two first main beams 11. An upper end of each second support member 14 is connected to one of the two first main beams 11, and a lower end of each second support member 14 is connected to one of the two first support members 13 on the same side as the one of the two first main beams 11. Thus, the two first main beams 11, the two first support members 13 and the two second support members 14 together define the accommodating space 15 for accommodating the fuel tank 4. The two first main beams 11, the two first support members 13 and the two second support members 14 can effectively wrap the tank 42 and hence improve the safety factor of the fuel tank 4. It can be understood that a size of the accommodating space 15 can be set specifically according to the actual needs so as to better adapt to the fuel tanks 4 of different sizes, thus better satisfying the practical applications.

Further, a distance between the first support member 13 and the second support member 14 on the same side gradually decreases from top to bottom, the tank body 42 matches with the accommodating space 15 in shape, and a sectional area of the tank body 42 gradually decreases from top to bottom. For example, referring to FIG. 7 and FIG. 8 in combination with FIG. 9, a projection of the accommodating space 15 on a longitudinal central plane of the vehicle 100 has a shape of a triangular prism. In this way, a fuel suction nozzle of the fuel pump of the fuel tank 4 can always be at a lowest position of the fuel tank 4 when the vehicle 100 is at various angles (such as upward and downward steep slopes) during driving. Even if there is less remaining fuel in the fuel tank 4, the fuel pump can still stably supply fuel to the powertrain 2 due to a small sectional area of a lower part of the fuel tank 4, so as to ensure the normal driving of the vehicle 100. Of course, the present disclosure is not limited to this, and the projection of the accommodating space 15 on the longitudinal central plane of the vehicle 100 can also have a shape of an inverted trapezoid.

Figure 7:
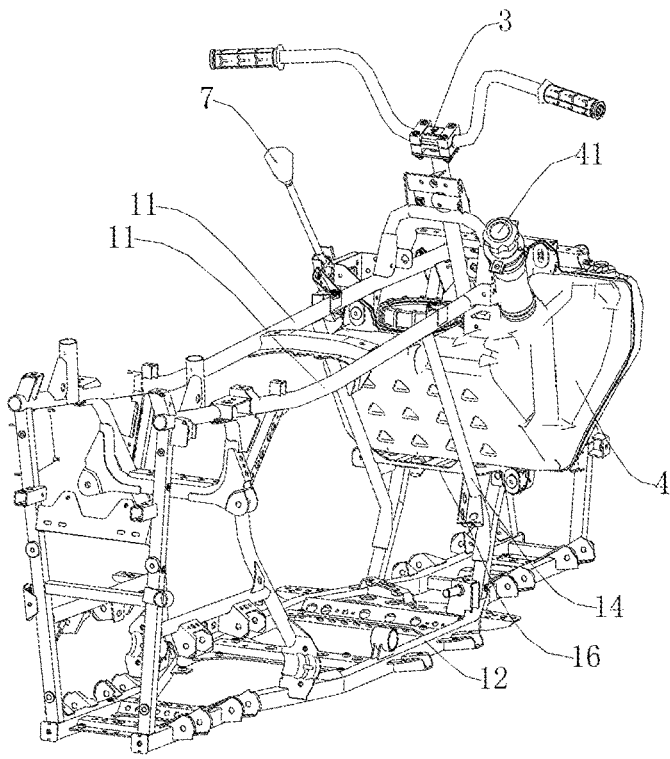
FIG. 7 is an assembly view of a fuel tank, a gear lever, a frame and a steering system of the vehicle shown in FIG. 6.
Figure 8:
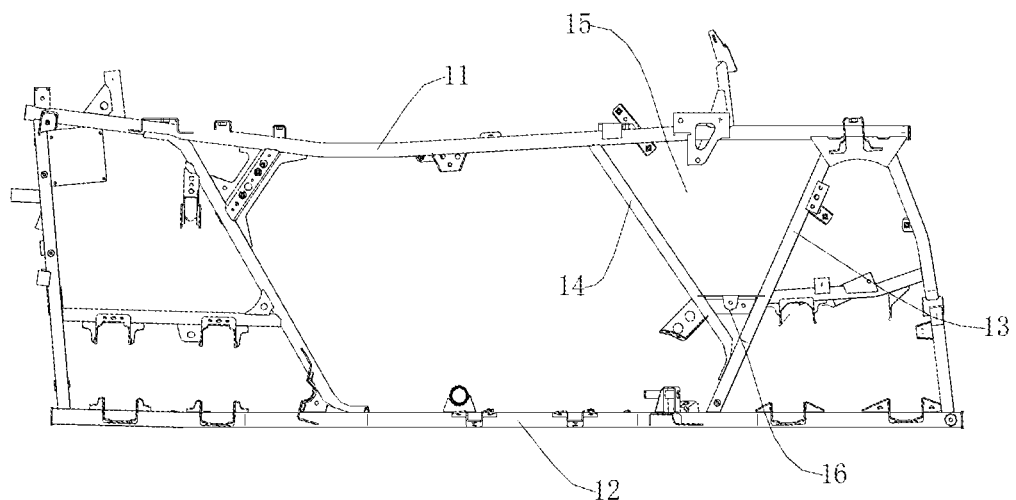
FIG. 8 is a schematic view of a frame of a vehicle according to an embodiment of the present disclosure.
Figure 9:
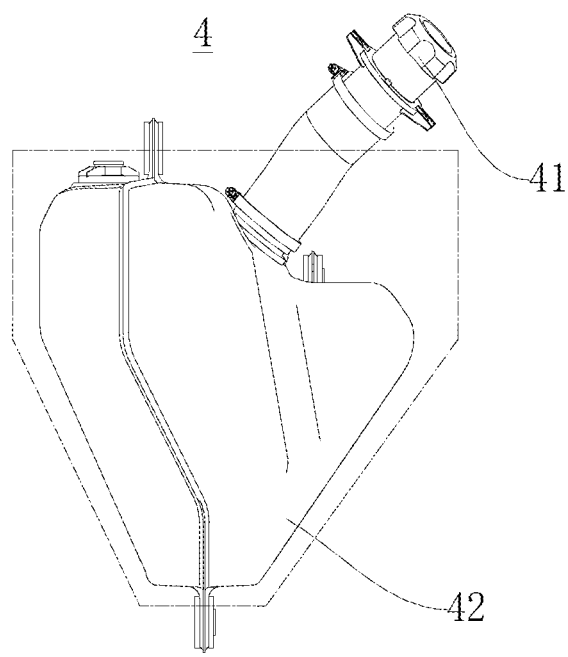
FIG. 9 is a schematic view of a fuel tank of a vehicle according to an embodiment of the present disclosure.

In some embodiments, as shown in FIG. 7 and FIG. 8, each first support member 13 extends obliquely backward from top to bottom, and each second support member 14 extends obliquely forward from top to bottom. In this way, the vehicle 100 under various driving postures can ensure that the fuel pump can supply fuel stably, and also, a structure of the whole frame 1 is more stable. Furthermore, more space can be reserved in front of the first support member 13 arranged obliquely to arrange the steering system 3, and more space can be reserved behind the lower end of the second support member 14 to arrange the powertrain 2, so that a structure of the whole vehicle 100 can be more compact.

Figure 4:
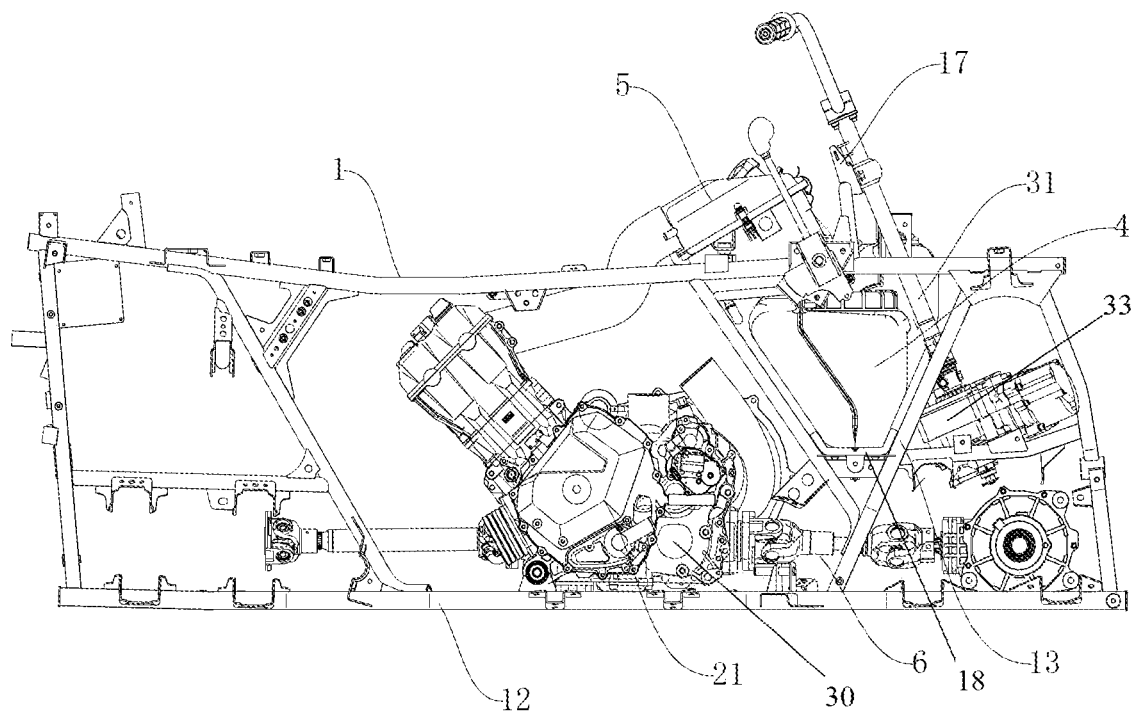
FIG. 4 is an assembly side view of a fuel tank, a gear lever, a frame and a steering system of the vehicle shown in FIG. 2.
Figure 5:
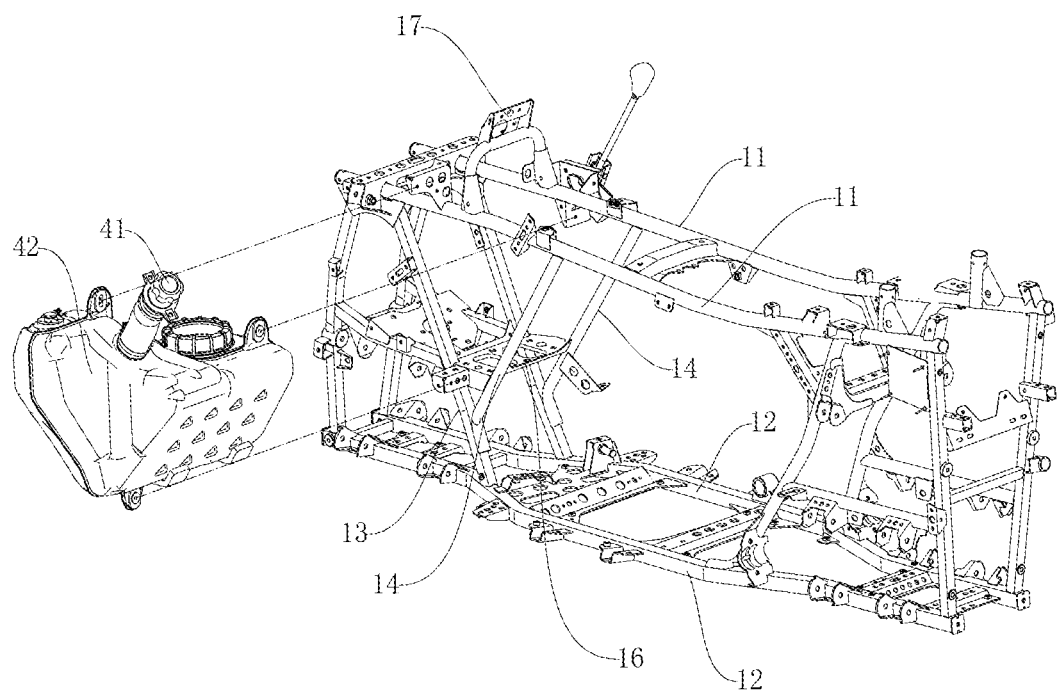
FIG. 5 is a schematic view of a fuel tank and a frame of the vehicle shown in FIG. 2.

According to some specific embodiments of the present disclosure, in combination with FIG. 4 and FIG. 5, a highest point of the tank body 42 is located below the two first main beams 11. Thus, a distance between the fuel tank 4 and the ground can be further reduced, so that a center of gravity of the fuel tank 4 can be further lowered, so as to further lower the center of gravity of the vehicle 100 and ensure the stability of the vehicle 100 during driving.

According to some embodiments of the present disclosure, the steering system 3 further includes an electronic power steering device 33, and projections of the fuel tank 4 and the electronic power steering device 33 on a vertical central plane of the vehicle 100 perpendicular to the longitudinal central plane of the vehicle 100 at least partially overlap with each other. Therefore, since a mounting point of the electronic power steering device 33 on the vehicle 100 is low, and the projections of the fuel tank 4 and the electronic power steering device 33 on the vertical central plane of the vehicle 100 at least partially overlap with each other, the center of gravity of the fuel tank 4 can be effectively lowered, so as to further lower the center of gravity of the vehicle 100.

According, to some embodiments of the present disclosure, the steering system 3 further includes a steering linkage 32 hinged with the steering shaft 31. When the steering shaft 31 rotates, the steering shaft 31 drives the steering linkage 32 to move. Since the steering linkage 32 is connected to the wheels 20, it drives the wheels 20 to rotate to allow the vehicle 100 to steer. A projection of a hinge point of the steering linkage 32 and the steering shaft 31 on the vertical central plane perpendicular to the longitudinal central plane of the vehicle 100 is located in a region of the projection of the fuel tank 4 on the above vertical central plane of the vehicle 100. Since the hinge point of the steering linkage 32 and the steering shaft 31 is relatively close to the ground, by arranging the fuel tank 4 in the above manner, the distance between the fuel tank 4 and the ground is reduced, thereby lowering the center of gravity of the fuel tank 4.

According to some embodiments of the present disclosure, the powertrain 2 includes a crankcase 21. A projection of the crankcase 21 on the vertical central plane of the vehicle 100 perpendicular to the longitudinal central plane of the vehicle 100 at least partially overlaps with the projection of the fuel tank 4 on the above vertical central plane of the vehicle 100. Referring to FIG. 4, the crankcase 21 of the powertrain 2 is mounted on the second main beams 12 so that the crankcase 21 is close to the ground. Since the projections of the crankcase 21 and the fuel tank 4 on the vertical central plane of the vehicle 100 perpendicular to the longitudinal central plane of the vehicle 100 at least partially overlap with each other, the distance between the fuel tank 4 and the ground can also be reduced, so as to effectively lower the center of gravity of the fuel tank 4.

According to a further embodiment of the present disclosure, a bracket 16 which is arranged horizontally is provided between the two first support members 13 and the two second support members 14, and the fuel tank 4 is placed on the bracket 16. Referring to FIG. 5 and FIG. 8, a left end of the bracket 16 is connected to the first support member 13 and the second support member 14 on the left, and a right end of the bracket 16 is connected to the first support member 13 and the second support member 14 on the right. When being mounted, the fuel tank 4 can be placed on the bracket 16. At this time, the bracket 16 supports the fuel tank 4 and can effectively ensure the stability of the fuel tank 4. The accommodating space 15 is defined by the two first main beams 11, the two first support members 13, the two second support members 14 and the bracket 16 together. A shape of a side surface of the accommodating space 15 is generally an inverted trapezoid, and a shape of the projection of the fuel tank 4 on the longitudinal central plane of the vehicle 100 is also substantially an inverted trapezoid. The two first main beams 11, the two first support members 13, the two second support members 14 and the bracket 16 can wrap the fuel tank 4 together, thus making the fuel tank 4 safer.

In some embodiments, the two first support members 13 and the two second support members 14 may each be a support tube, but are not limited to this.

In some embodiments, a backing plate 18 is arranged on the bracket 16. When the vehicle 100 is driving in poor road conditions, the backing plate 18 can absorb a certain degree of vibration and have a damping effect on the fuel tank 4, so as to ensue the stability of the fuel tank 4 during the driving of the vehicle 100, and further improve the safety of the fuel tank 4.

In some embodiments, the backing plate 18 is a flexible rubber pad. The flexible rubber pad can have a base material of EVA (Ethylene Vinyl Acetate Copolymer) foam, coated with a high-performance pressure-sensitive adhesive on one or both sides, and formed by die-cutting and stamping composite single silicon or double silicon release materials. The flexible rubber pad has excellent weather resistance performance, chemical resistance performance, cushioning performance, sound absorption performance and adhesion performance. The flexible rubber pad has a soft texture and can effectively ensure the stableness of the fuel tank 4 during the driving of the vehicle 100, while ensuring a good supporting effect on the fuel tank 4. However, the present disclosure is not limited to this.

Figure 3:
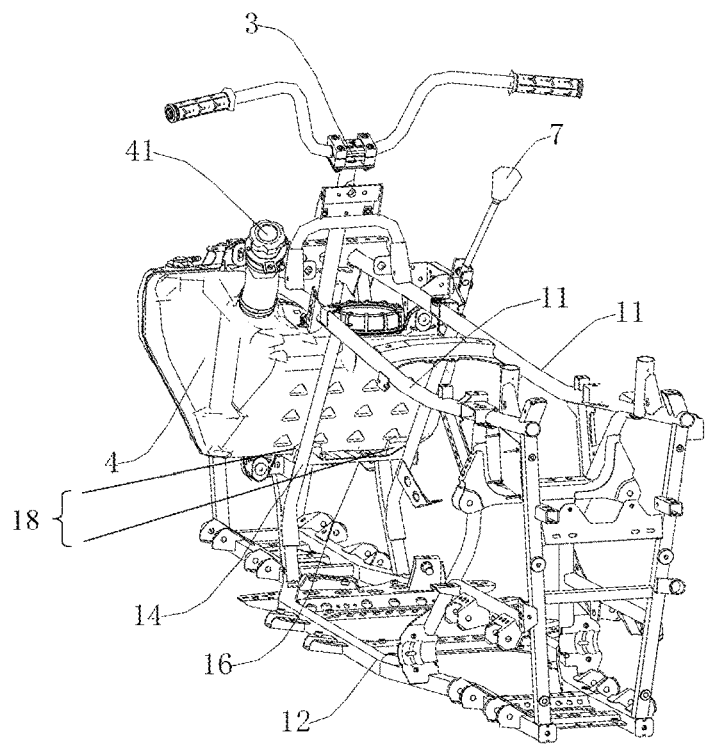
FIG. 3 is an assembly view of a fuel tank, a gear lever, a frame and a steering system of the vehicle shown in FIG. 2.

According to some embodiments of the present disclosure, the frame 1 is provided with a connecting plate 17, the steering shaft 31 is connected to the connecting plate 17, and the highest point of the tank body 42 is located below the connecting plate 17. As shown in FIGS. 3-5, the connecting plate 17 is mounted above the first main beams 11. The connecting plate 17 can be used as a carrier for mounting the steering shaft 31 to ensure the mounting stability of the steering shaft 31. Therefore, since the highest point of the tank body 42 is arranged below the connecting plate 17, it can be effectively ensured that the fuel tank 4 is located between the steering shaft 31 and the powertrain 2, so as to effectively lower the center of gravity of the fuel tank 4.

According to some embodiments of the present disclosure, the vehicle 100 further includes a gearbox 30, and an intake pipe of the gearbox 30 is located on a left or right side of the fuel tank 4. In this way, a compact structure of the vehicle 100 can be effectively ensured and the assembly of the vehicle 100 is also facilitated.

Figure 2:
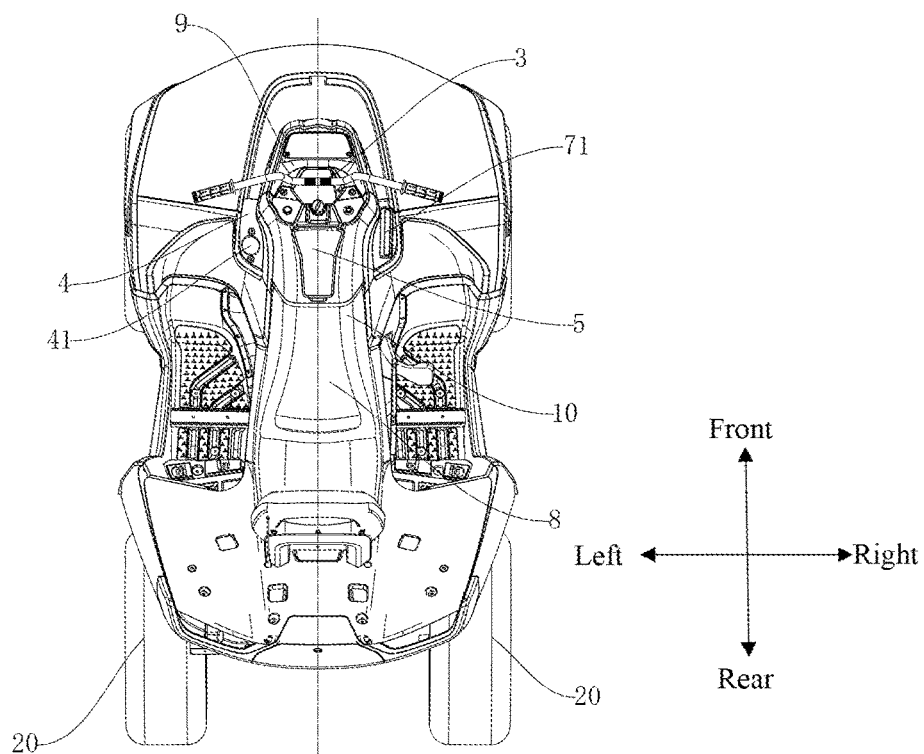
FIG. 2 is a top view of a vehicle according to an embodiment of the present disclosure.
Figure 6:
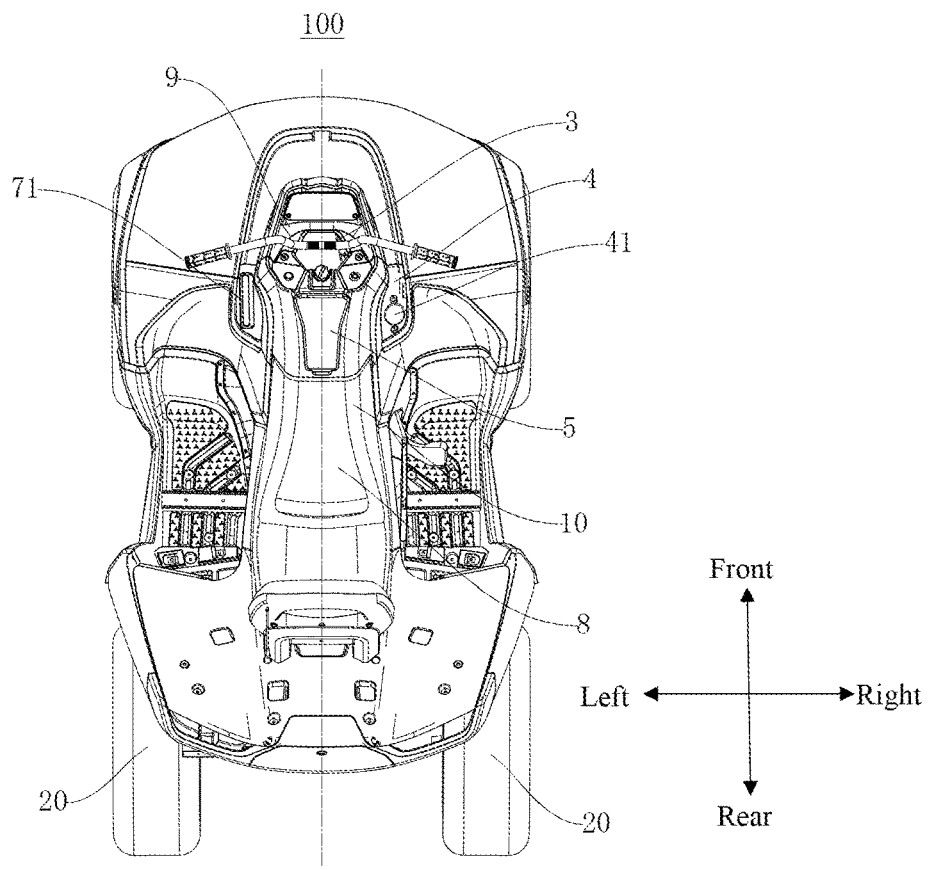
FIG. 6 is a top view of a vehicle according to another embodiment of the present disclosure.

According to some embodiments of the present disclosure, as shown in FIG. 1, FIG. 2 and FIG. 6, an air filter 5 and a transmission shaft 6 located below the air filter 5 are arranged to the frame 1, and the fuel tank 4 is located below the air filter 5 and above the transmission shaft 6. For example, the air filter 5 can be mounted between the two first main beams 11, and can be connected to the powertrain 2 through an air pipeline so as to ensure the cleanness of the air inside the powertrain 2. The transmission shaft 6 is arranged between the two second main beams 12, and the fuel tank 4 is arranged between the air filter 5 and the transmission shaft 6. Thus, a height of the fuel tank 4 can be further reduced, so as to lower the center of gravity of the vehicle 100, and ensure the stability of the vehicle 100 during driving. Moreover, the steering shaft 31, the powertrain 2, the air filter 5 and the transmission shaft 6 can wrap the fuel tank 4 together, further improving the safety of the fuel tank 4. In this way, the fuel tank 4 is arranged in front of the powertrain 2, behind the steering shaft 31, below the air filter 5 and above the transmission shaft 6 of the vehicle 100.

According to some embodiments of the present disclosure, a gear lever 7 is arranged to the frame 1, the fuel tank 4 has a fuel filler 41, and the fuel filler 41 and the gear lever 7 are symmetrical about the longitudinal central plane of the vehicle 100 in the left-right direction. For example, as shown in FIGS. 1-7, the vehicle 100 further includes an instrument cover 9, a body trim cover 10 and a set of wheels 20. The body trim cover 10 is mounted between the seat 8 and the instrument cover 9, and the fuel filler 41 and a gear-lever positioning groove 71 are on left and right sides of the body trim cover 10, respectively, so that the fuel filler 41 and the gear lever 7 are approximately symmetrical about the longitudinal central plane of the vehicle 100 in the left-right direction. The gear lever 7 can be mounted to a side of the frame 1 in a width direction through the gear lever positioning groove 71, and is arranged adjacent to the first main beams 11. The gear lever 7 can be connected to the powertrain 2 to change an output ratio and an output direction of the power of the powertrain 2. The fuel filler 41 is arranged on an upper portion of the fuel tank 4. Based on the longitudinal central plane defined by the wheels 20 of the vehicle 100, the fuel filler 41 and the gear lever 7 can be approximately symmetrically arranged on the left and right sides of the whole vehicle. It can be understood that the fuel filler 41 and the gear lever 7 are arranged on the left and right sides of the body trim cover 10 between the seat 8 and the instrument cover 9 of the vehicle 100. The fuel filler 41 may be arranged on the left side of the longitudinal central plane of the vehicle 100, and the gear lever 7 may be arranged on the right side of the longitudinal central plane of the vehicle 100 (as shown in FIG. 2 and FIG. 3); or, the fuel filler 41 may also be arranged on the right side of the longitudinal central plane of the vehicle 100, and the gear lever 7 may also be arranged on the left side of the longitudinal central plane of the vehicle 100 (as shown in FIG. 6 and FIG. 7). Thus, a position of the fuel filler 41 is easy to access so as to facilitate refueling, and it is not easy for the fuel filler 41 to collide with other components during the mounting of the fuel tank 4.

Other configurations and operations of the vehicle 100 according to the embodiments of the present disclosure are known to those skilled in the art and will not be described in detail here.

In the description of the present disclosure, it is to be understood that terms such as "central," "longitudinal," "transverse," "length," "width," "thickness," "upper," "lower," "front," "rear," "left," "right," "vertical," "horizontal," "top," "bottom," "inner," "outer," should be construed to refer to the orientation or position as then described or as shown in the drawings under discussion. These relative terms are for convenience of description of the present disclosure and do not indicate or imply that the device or element referred to must have a particular orientation, or be constructed and operated in a particular orientation. Thus, these terms shall not be construed as limitation on the present disclosure.

In the description of the present disclosure, it shall be noted that unless specified or limited explicitly otherwise, the terms "mounted," "interconnected," "connected" shall be understood broadly, and may be, for example, fixed connections, may also be detachable connections, or integral connections; may be direct connections or indirect connections via intervening medium; may be inner communications of two elements. For those skilled in the art, the specific meaning of the above terms in the present disclosure can be understood according to specific situations.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. A vehicle, comprising:
   a frame;
   a seat arranged on the frame;
   a powertrain arranged on the frame;
   a steering system arranged on the frame and comprising a steering shaft, and the steering shaft being located in front of the powertrain; and
   a fuel tank arranged on the frame, and located behind the steering shaft and in front of the powertrain,
   wherein an air filter and a transmission shaft located below the air filter are arranged to the frame, and the fuel tank is located below the air filter and above the transmission shaft;
   wherein the fuel tank comprises a tank body;
   the frame comprises:
   two first main beams spaced apart in a left-right direction;
   two second main beams spaced apart in the left-right direction, and located below the two first main beams, respectively;
   two first support members spaced apart in the left-right direction, and two ends of each first support member being connected to the first main beam and the second main beam on the same side, respectively; and
   two second support members spaced apart in the left-right direction, and two ends of each second support member being connected to the first main beam and the first support member on the same side, respectively, and a part of each second support member being located behind the fuel tank, an entire end of the fuel tank where a fuel filler is arranged extending beyond the corresponding second support member in a direction facing away from a longitudinal central plane of the vehicle along the left-right direction,
   wherein the two first main beams, the two first support members and the two second support members define an accommodating space together, the tank body is arranged in the accommodating space, and the two first main beams, the two first support members and the two second support members effectively wrap the tank body, and
   wherein a bracket is arranged between the two first support members and the two second support members, the bracket is arranged horizontally and the fuel tank is arranged on the bracket.

2. The vehicle according to claim 1, wherein a projection of the accommodating space on the longitudinal central plane of the vehicle has a shape of a triangular prism or an inverted trapezoid.

3. The vehicle according to claim 1, wherein each first support member extends obliquely backward from top to bottom, and each second support member extends obliquely forward from top to bottom.

4. The vehicle according to claim 1, wherein a highest point of the tank body is located below the two first main beams.

5. The vehicle according to claim 1, wherein the steering system further comprises an electronic power steering device, and projections of the fuel tank and the electronic power steering device on a vertical central plane of the vehicle perpendicular to the longitudinal central plane of the vehicle at least partially overlap with each other.

6. The vehicle according to claim 1, wherein the steering system further comprises a steering linkage hinged with the steering shaft, and a projection of a hinge point of the steering linkage and the steering shaft on a vertical central plane of the vehicle perpendicular to the longitudinal central plane of the vehicle is located in a region of a projection of the fuel tank on the vertical central plane of the vehicle.

7. The vehicle according to claim 1, wherein the powertrain comprises a crankcase, and the crankcase is mounted on the second main beams.

8. The vehicle according to claim 7, wherein a projection of the crankcase on a vertical central plane of the vehicle perpendicular to the longitudinal central plane of the vehicle at least partially overlaps with a projection of the fuel tank on the vertical central plane of the vehicle.

9. The vehicle according to claim 1, wherein the accommodating space is defined by the two first main beams, the two first support members, the two second support members and the bracket.

10. The vehicle according to claim 1, wherein a backing plate is arranged on the bracket.

11. The vehicle according to claim 10, wherein the backing plate is configured as a flexible rubber pad.

12. The vehicle according to claim 1, wherein each of the two first support members and the two second support members is configured as a support tube.

13. The vehicle according to claim 1, wherein the frame is provided a connecting plate, and the steering shaft is connected to the connecting plate;
   the fuel tank comprises a tank body, and a highest point of the tank body is located below the connecting plate.

14. The vehicle according to claim 1, wherein a gear lever is arranged to the frame,
   the fuel filler and the gear lever are symmetrical about the longitudinal central plane of the vehicle in the left-right direction.

15. The vehicle according to claim 1, wherein the vehicle is configured to a straddle all-terrain vehicle.

16. The vehicle according to claim 1, wherein a distance between the first support member and the second support member on the same side gradually decreases from top to bottom, the tank body matches with the accommodating space in shape, and a sectional area of a lower part of the tank body gradually decreases from top to bottom.

* * * * *